Nov. 6, 1934.  A. P. LEWIS  1,979,561
FRICTION DRIVE DEVICE
Filed Jan. 6, 1933
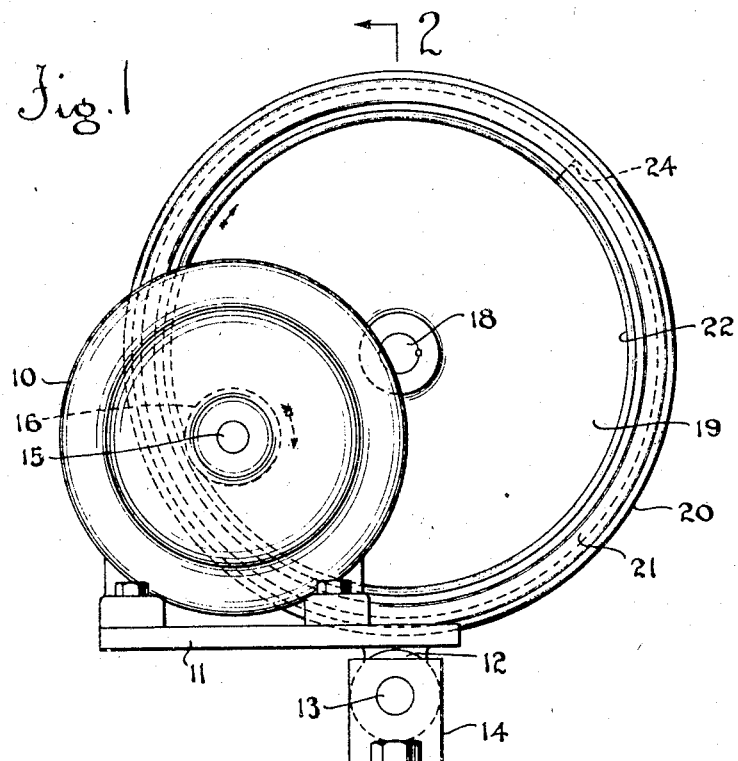
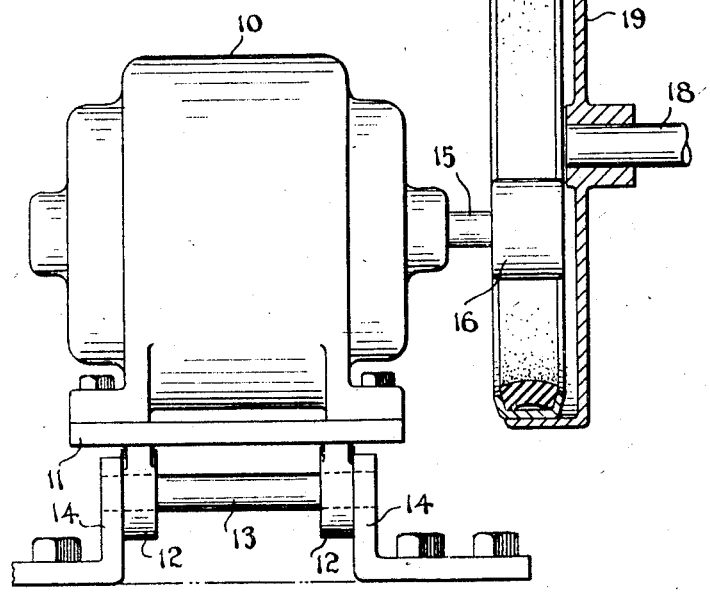
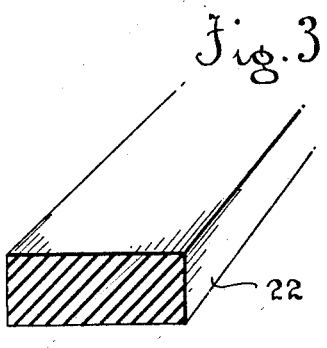
INVENTOR
Arthur P. Lewis
ATTORNEYS Patented Nov. 6, 1934

1,979,561

UNITED STATES PATENT OFFICE 1,979,561

FRICTION DRIVE DEVICE

Arthur P. Lewis, Akron, Ohio, assignor to The Firestone Tire & Rubber Company, Akron, Ohio, a corporation of Ohio Application January 6, 1933, Serial No. 650,406

2 Claims. (Cl. 74—206)

This invention relates to friction drive devices, and is of especial utility in installations employing fractional horse power motors, such as refrigeration units, air conditioners, domestic water pumps, oil burners, and numerous other situations.

The chief objects of the invention are to provide an improved friction drive device for the purpose mentioned that will be quiet in operation; that will be more compact than ordinary installations using driving belts; and that may be easily and quickly assembled or repaired. Other objects of the invention are to provide a construction in which the pressure between the driving and driven members automatically is proportional to the load; to provide an improved frictional element for the driven member; and to provide an improved mounting for said frictional member. Other objects will be manifest.

Of the accompanying drawing:

Figure 1 is an end elevation of a frictional drive device embodying the invention in its preferred form;

Figure 2 is a section on the line 2—2 of Figure 1; and

Figure 3 is a fragmentary sectional perspective view of the frictional element of the driven member as it appears before mounting in the latter.

Referring to the drawing, 10 is an electric motor that is mounted upon a base plate 11, the latter being formed, adjacent one margin thereof, with downwardly-extending ears 12, 12 that are pivotally mounted upon a hinge pin 13 that is carried by a pair of suitable brackets 14, 14. The motor 10 is so arranged on the base plate 11 that its shaft 15 is parallel to the hinge pin 13. A driving pulley 16 of wood is mounted upon the projecting end of motor shaft 15.

The apparatus to be driven may be any of those hereinbefore noted, and only the shaft 18 thereof is shown in the drawing. Mounted upon the end of shaft 18 is a disc or fly wheel 19 that is provided with a laterally extending marginal flange 20 to the inner perimeter of which is secured a retainer 21 for the frictional element of the driven member. The retainer 21 is an annular channel, the lateral flanges of which extend inwardly and diverge toward the axis of the retainer, so that the retainer is narrowest at its base. The retainer may be secured to the flange 20 by spot welding.

The frictional element of the driven member, designated 22, is normally rectangular in section, as shown in Figure 3, and is made of tough, resilient, rubber composition which may be suitably reinforced if desired. It is molded to shape, and may be made initially of proper length; or it may be made in long strips that are subsequently cut into a plurality of shorter lengths, suitable for individual elements. In mounting the strip 22 in the retainer 21, the strip is bent longitudinally to ring shape, with the result that the outer peripheral portion thereof is placed under tension and the inner peripheral portion is placed under compression. This causes the strip to assume a transversely arcuate shape that is concave on its outer periphery and convex on its inner periphery, the sides of the strip being oblique so as to fit against the diverging sides of the retainer.

The strip 22 is made slightly longer than the retainer seat, so that it is necessary to compress the strip slightly to bring its ends into abutting relation within the retainer, as shown at 24, Figure 1. As is clearly shown in Figure 2, the outer perimeter of the strip 22 will be somewhat arched and spaced from the inner peripheral face of the retainer 21.

In operation, the driving pulley 16 of motor 10 bears against the friction strip 22, proper driving pressure being maintained by gravity by reason of the pivotal mounting of the motor. The pressure of the pulley 16 forces the element 22 more firmly into the retainer 21, and thus augments the normal compression of the strip in frictionally resisting any relative movement between the element and the retainer. Thus no adhesives or other means are required for retaining the element in its seat, whereby installation or replacement of the element is facilitated.

The motor 10 is driven in the direction indicated by the arrow, Figure 1, and relative positions of the pulley 16 and pivot 13 is such that added load on the driven member results in added pressure of the pulley against the friction member, the pressure thus being automatically proportional to the load. The coefficient of friction between the materials used for the pulley 16 and strip 22 is very high approaching unity, and since the said strip is not subjected to tensile strains it cannot break and thus entirely fail.

The device is easily provided with guards so as not to be dangerous where children are present, and it achieves the other advantages set out in the foregoing statement of objects.

Modification may be resorted to without departing from the spirit of the invention or the scope of the appended claims, which are not limited wholly to the specific construction shown and described.

What is claimed is:

1. In a device of the character described, the combination of a driving pulley and a driven wheel, said driven wheel comprising an internal annular channel with diverging sides that constitutes a retainer for a friction element, and a resilient friction element mounted in said retainer, said friction element being concavo-convex in transverse section with its concave face in the bottom of the retainer, and having sloped sides in face to face engagement with the diverging sides of the retainer, said driving pulley engaging the friction element on the interior of said wheel and tending to force said concavo-convex friction element into firm engagement with the sides of said annular channel as said wheel is driven.

2. In a device of the character described, the combination of a driving pulley and a driven wheel, said driven wheel comprising an inwardly open internal annular channel having sidewalls that diverge toward the axis of the channel, and a resilient friction element mounted in said channel, said friction element having a transversely concave outer periphery and a transversely convex inner periphery, and having sloped sidewalls in face to face relation with the sidewalls of the channel, said driving pulley engaging the friction element on the interior of said wheel and tending to force said concavo-convex friction element into firm engagement with the sides of said annular channel as said wheel is driven.

ARTHUR P. LEWIS.